US009267781B2

(12) United States Patent
Ausserlechner

(10) Patent No.: US 9,267,781 B2
(45) Date of Patent: Feb. 23, 2016

(54) ON-AXIS MAGNETIC FIELD ANGLE SENSORS, SYSTEMS AND METHODS

(71) Applicant: INFINEON TECHNOLOGIES AG, Neubiberg (DE)

(72) Inventor: Udo Ausserlechner, Villach (AT)

(73) Assignee: Infineon Technologies AG, Neubiberg (DE)

( * ) Notice: Subject to any disclaimer, the term of this patent is extended or adjusted under 35 U.S.C. 154(b) by 164 days.

(21) Appl. No.: 14/083,639

(22) Filed: Nov. 19, 2013

(65) Prior Publication Data

US 2015/0137796 A1   May 21, 2015

(51) Int. Cl.
  *G01B 7/30*  (2006.01)
  *G01R 33/07*  (2006.01)
  *G01R 33/09*  (2006.01)
  *G01B 7/00*  (2006.01)
  *G01D 5/12*  (2006.01)

(52) U.S. Cl.
  CPC  *G01B 7/30* (2013.01); *G01B 7/003* (2013.01); *G01D 5/12* (2013.01)

(58) Field of Classification Search
  CPC ........... G01R 33/07; G01B 33/07; G01B 7/30
  USPC ................................................. 324/207.25
  See application file for complete search history.

(56) References Cited

U.S. PATENT DOCUMENTS

| | | | | |
|---|---|---|---|---|
| 3,777,273 A * | 12/1973 | Baba et al. | .................... | 335/236 |
| 5,194,808 A * | 3/1993 | Shintaku et al. | ............... | 324/248 |
| 5,365,787 A * | 11/1994 | Hernandez et al. | ............. | 73/660 |
| 6,356,073 B1 * | 3/2002 | Hamaoka et al. | .......... | 324/207.2 |
| 6,486,659 B1 * | 11/2002 | Schroeder | ................ | 324/207.21 |
| 2009/0206827 A1 * | 8/2009 | Aimuta et al. | ............ | 324/207.25 |

* cited by examiner

*Primary Examiner* — Bot Ledynh
(74) *Attorney, Agent, or Firm* — Schiff Hardin LLP

(57) ABSTRACT

Embodiments relate to magnetic field sensors, such as magnetic field angle sensors with generally on-axis arrangements of sensor elements relative to a rotation axis of a magnet or shaft. The shaft comprises or is coupled to an end portion that comprises a soft magnetic material, in embodiments, with the end portion having an end surface proximate the sensor that is rotationally asymmetric with respect to the rotation axis running through the length of the shaft. The sensor comprises at least three magnetic field sensing elements arranged in a plane generally perpendicular to the shaft and rotation axis. Circuitry forming part of or coupled to the sensor is configured to estimate a rotational position of the shaft by combining the signals of the at least three magnetic field sensing elements.

18 Claims, 15 Drawing Sheets

ON-AXIS MAGNETIC FIELD ANGLE SENSORS, SYSTEMS AND METHODS

TECHNICAL FIELD

The invention relates generally to magnetic field sensors, and more particularly to on-axis magnetic field angle sensors, systems and methods having a variety of applications, including in brushless direct current (DC) motors.

BACKGROUND

Magnetic field sensors can be used to sense an angle of rotation of a shaft or other object. For example, a magnet can be mounted on the shaft, and a magnetic field sensor can be arranged proximate the magnet in order to sense a magnetic field induced by the magnet as it rotates with the shaft. When the magnetic field sensor is mounted next to or adjacent the shaft, i.e., off of the axis of rotation of the shaft, the sensor is often referred to as an "off-axis" magnetic field angle sensor. Off-axis magnetic field angle sensors often are implemented when the end of the shaft is unavailable as a location for the sensor or there simply is not space available on the shaft. Generally, an "on-axis" magnetic field sensor, then, is one in which the sensor is mounted at or near the end of the shaft, generally in-line with or on the axis of rotation. In some embodiments, on-axis magnetic field angle sensors can comprise gradiometers, such that an on-axis magnetic field gradient sensor measures a gradient of the magnetic field on the rotation axis. The gradient can be measured in sufficient approximation in some applications by sampling the magnetic field at samplings points close to and on opposing sides of the axis and combining the samples, such as by subtraction.

In many applications there is a general preference for magnetic field angle sensors, whether off- or on-axis, to be inexpensive while also being robust with respect to external magnetic fields and other disturbances and insensitive to assembly tolerances. One particular application for magnetic field angle sensors is in brushless DC (BLDC) motors for the detection of the shaft position in rotation. BLDC motors present a challenging environment for magnetic field sensors as they typically include strong rotating magnets and copper windings carrying large currents, both of which produce time-varying magnetic fields. These fields are strongly inhomogeneous, which makes it difficult to cancel their effects from an angle sensor signal, and their strength can be hard to predict. Overall sensor size is also a consideration in order to avoid adding additional mass or volume to the BLDC motor. Smaller gradiometric-type sensors also can be more efficient in canceling background magnetic field disturbances. In general, therefore, there are numerous drawbacks associated with conventional magnetic field angle sensors.

SUMMARY

Embodiments relate to magnetic field sensors, such as magnetic field angle sensors with generally on-axis arrangements of sensor elements relative to a rotation axis of a magnet or shaft.

In an embodiment, a magnetic field angle sensor system comprises a shaft rotatable around a rotation axis; an end portion rotatable with the shaft and being rotationally asymmetric with respect to the rotation axis; a sensor die spaced apart from the end portion and comprising a first surface being substantially perpendicular to the rotation axis; at least three magnetic field sensor elements arranged spaced apart from one another on the first surface around a projection of the rotation axis onto the first surface; a magnetic field source; and circuitry coupled to the at least three magnetic field sensor elements and configured to estimate a rotational position of the shaft by combining signals of the at least three magnetic field sensor elements when, in operation, the end portion is magnetized by the magnetic field source and alters a magnetic field sensed by the at least three magnetic field sensor elements when the end portion rotates with the shaft.

In an embodiment, a method comprises providing a shaft rotatable around a rotation axis; altering a magnetic field by a non-rotationally symmetric end portion of the shaft; sensing the altered magnetic field by at least three magnetic field sensor elements arranged proximate the end portion on a surface substantially perpendicular to the rotation axis; and estimating an angular position of the shaft by applying a discrete Fourier transform to sensed signals of the at least three magnetic field sensor elements.

BRIEF DESCRIPTION OF THE DRAWINGS

The invention may be more completely understood in consideration of the following detailed description of various embodiments of the invention in connection with the accompanying drawings, in which:

FIG. 10A is a plot of sensor element signals at various azimuthal sensor element positions according to an embodiment.

FIG. 10B is a plot of sensor element signals at various azimuthal sensor element positions according to an embodiment.

FIG. 10C is a plot of sensor element signals at various azimuthal sensor element positions according to an embodiment.

FIG. 10D is a plot of sensor element signals at various azimuthal sensor element positions according to an embodiment.

Figure 1:
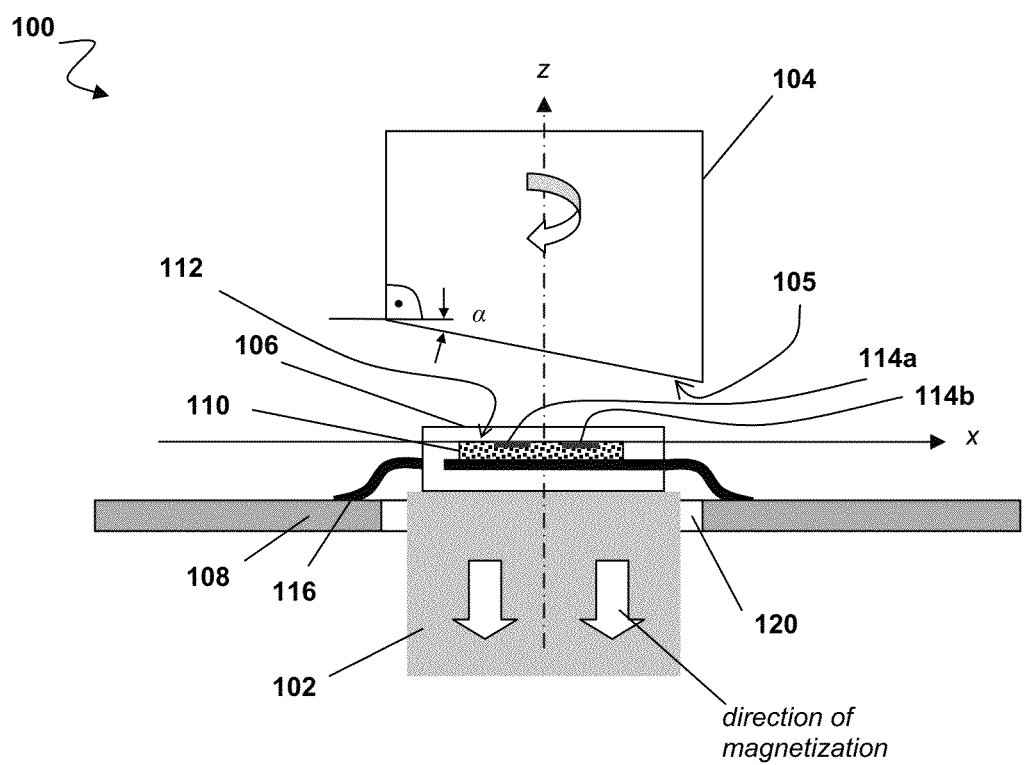
FIG. 1 is a side cross-sectional view of an on-axis magnetic field sensor system according to an embodiment.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

Embodiments relate to magnetic field sensors, such as magnetic field angle sensors with generally on-axis arrangements of sensor elements relative to a rotation axis of a magnet or shaft. In one embodiment, a magnetic field angle sensor is mounted in a generally on-axis configuration relative to a rotatable shaft and a magnet. The shaft comprises or is coupled to an end portion that comprises a soft magnetic material, in embodiments, with the end portion having an end surface proximate the sensor that is rotationally asymmetric with respect to the rotation axis running through the length of the shaft. The sensor comprises at least three magnetic field sensing elements arranged in a plane generally perpendicular to the shaft and rotation axis. Circuitry forming part of or coupled to the sensor is configured to estimate a rotational position of the shaft by combining the signals of the at least three magnetic field sensing elements. Thus, in embodiments, the sensor comprises a differential sensor. While numerous applications exist for various embodiments of the sensor, some embodiments can be particularly suitable for use in or with BLDC motors, among other applications.

Referring to FIG. 1, an example of an on-axis angle sensor system 100 is depicted. Sensor system 100 comprises a magnetic field source, such as a permanent magnet 102, arranged opposite a shaft 104, with a sensor package 106 coupled to a printed circuit board (PCB) 108 arranged at least partially therebetween.

Magnet 102 can comprise a ferrite magnet in embodiments. Ferrite magnets can be less expensive than other types of magnets (e.g., rare-earth magnets) and contribute to lower overall system cost, though in other embodiments rare earth or other magnets can be used, or magnet 102 can be omitted. For example, magnet 102 can comprise an Sr-ferrite, a Ba-ferrite, or some other ferrite, AlNiCo, a rare-earth material such as NdFeB or SmCo, or some other suitable material. Generally, magnet 102 comprises a material having a remanence of at least about 100 mT and sufficient coercivity to ensure stability of magnet 102 throughout operations, storage and manufacturing temperature variations and lifetime.

As depicted by the solid white arrows, magnet 102 is axially magnetized in embodiments, i.e., the orientation of magnetization of magnet 102 is generally parallel to or aligned with the axis of rotation of shaft 104. In FIG. 1, the axis of rotation is generally aligned with the z-axis with which shaft 104 is aligned, i.e., shaft 104 rotates about the z-axis as indicated by the arrow on shaft 104, and magnet 102 is magnetized in the −z-direction. In other embodiments, magnet 102 can be radially or otherwise magnetized, though generally magnet 102 is rotationally symmetric (i.e., has both geometric and magnetic symmetry such that the geometry and magnetization do not depend on the azimuthal angle relative to the rotation axis). For example, magnet 102 comprises a cylinder in the embodiment of FIG. 1, though other shapes and configurations of magnet 102 can be implemented in other embodiments. In general, however, magnet 102 has rotational symmetry and, in operation, provides a magnetic field with rotation symmetry. The non-rotationally symmetric configuration of an end surface of shaft 104, however, interrupts this rotational symmetry, which can then be detected by the sensor elements.

In particular, shaft 104 comprises an end surface 105 that opposes magnet 102 and sensor package 106. In embodiments, shaft 104 generally can be rotationally symmetric (i.e., comprise an elongated circular cylinder) while end surface 105 is rotationally asymmetrical with respect to the rotation axis. This rotational asymmetry can take many different forms in various embodiments. In the embodiment of FIG. 1, end surface 105 is oblique, i.e., not perpendicular to the rotation axis according to some angle α, or not parallel with opposing surfaces of sensor package 106 and/or magnet 102. In one embodiment, α is about 15 degrees, though α can be larger or smaller in other embodiments, e.g., between about 0 degrees and about 90 degrees, such as between about 5 degrees and about 25 degrees in embodiments. In other words, the gap between end surface 105 and sensor package 106 is greater at one side of end surface 105 (the left side in FIG. 1) than the other (the right side in FIG. 1). Other configurations of end surface 105 can be used in other embodiments, with additional examples depicted and discussed elsewhere herein. Shaft 104 and its end surface 105 can be formed in any suitable way, e.g., by milling, cutting, grinding, molding, etc.

Any particular references to directions made herein throughout (i.e., downward, upward, right, left, etc.) are merely used for reference to the arrangement of a drawing on the page unless otherwise specified and not are limiting with respect to the claims and/or any orientation that may be implemented or used in practice.

In embodiments, shaft 104 comprises a ferrous material, such as a soft magnetic material, like iron or mild steel, having a relative permeability of about μr=4,000 (for iron) or 1,600 (for steel). More generally, shaft 104 can comprise a ferrous material having a relative permeability that is greater than about 100, such as greater than about 1,000. In other embodiments, a ferrous material, part or portion can be coupled to a non-ferrous shaft, such as in embodiments in which shaft 104 comprises a non-iron alloy, a non-magnetic or low-magnetic austenitic steel, or some other non-ferrous or low ferrous material.

Sensor package 106 is arranged generally between magnet 102 and shaft 104, directly or indirectly coupled with magnet 102 in some embodiments (such as the one of FIG. 1) and spaced apart from end surface 105 by an air gap. Sensor package 106 can be arranged in line with the rotation axis (i.e., "on-axis"), and comprises a sensor die 110. Though referred to herein generally as a "die," die 110 can comprise a die, substrate, circuit board or other structure, comprising a semiconductor material, ceramic, glass, epoxy (e.g., a glass fiber-reinforced epoxy such as FR4) or other suitable material, with or without package 106, in various embodiments, and use of the term "die" herein is not to be considered limiting to any particular embodiment or with respect to the claims. Die 110 is generally perpendicular to or orthogonal with the rotation axis and comprises a primary surface 112 on which a plurality of sensor elements 114a and 114b are arranged. While two sensor elements 114a and 114b are visible in FIG. 1, embodiments generally will comprise at least three sensor elements, though more or fewer can be used in some embodiments. Surface 112 is generally the xy-planar surface facing upwardly in the orientation of FIG. 1 and is arranged perpendicularly to the rotation axis of shaft 104 as illustrated. In other embodiments, die 110 can be inverted such that surface 112 faces downwardly, or arranged in some other suitable manner. In FIG. 1, two magnetic field sensor elements 114a and 114b are visible on die 110, though in other embodiments discussed herein more or fewer sensor elements generally can be used, such as at least three sensor elements in embodiments.

Die 110 and/or package 106, which can comprise a surface-mount (SMD) package in such a configuration, can be coupled to a leadframe 116, which in turn can be coupled to PCB 108. In the embodiment of FIG. 1, magnet 102 is arranged at least partially within an aperture 120 of PCB 108 such that magnet 102 can be coupled to a backside (i.e., facing downwardly in FIG. 10 of package 106), though in other embodiments magnet 102 can be mounted below PCB or in some other configuration. For example, in one embodiment magnet 102 is mounted to the backside of PCB 108, the backside being that which is facing generally downward in FIG. 1. Similarly, the relative configuration of package 106, leadframe 116 and PCB 108 also can vary in embodiments, and one or more of leadframe and PCB 108 can be omitted in embodiments in which other components or arrangements are used. For example, in another embodiment magnet 102 can be mounted to the backside of die 110 before molding the plastic or other encapsulation of package 106, and/or package 106 can be leadless, leaded or chip-sized. Die 110 also can be face-up as in FIG. 1 or face-down (i.e., "flip-chip") in other embodiments. For example, in one embodiment die 110 can be flip-chip mounted on a bottom surface of PCB 108, with magnet 102 mounted on the top surface, which more or less reverses the configuration of magnet 102, PCB 108 and package 106 depicted in FIG. 1 (in which aperture 120 can be present or omitted in this other embodiment). Such an embodiment can provide additional protection for package 106 and the circuitry of PCB 108 with magnet 102 more proximate the moving shaft 104 while also providing cost advantages. In still other embodiments, magnet 102 and package 106 can be mounted on the same side of PCB 108, and/or magnet 102 also can be arranged between package 106 and shaft 104. In some embodiments, it can be advantageous for magnet 102 to comprise a mold compound and magnetic filler material that can be formed on or around die 110, with or without package 108, or PCB 108, or some other configuration. In other words, the particular arrangement depicted in FIG. 1 is but one non-limiting example of one embodiment, and still others are depicted and discussed herein below. Moreover, the figures generally are not to scale and are a simplified conceptual depiction to illustrate basic components and features of embodiments of system 100.

Sensor elements 114 are sensitive to axial magnetic field components in one embodiment, though in other embodiments sensor elements 108 can also or instead be sensitive to radial or azimuthal magnetic field components or combinations of any of the components. Thus, in various embodiments, sensor elements 114 can comprise magnetoresistive (MR) sensor elements (e.g., AMR, GMR, TMR, CMR and others), giant magneto-impedance (GMI) sensor elements, Hall-effect sensor elements (e.g., vertical Hall, Hall plates, and others), MAGFETs, and other magnetic field sensor elements and combinations thereof. Unless otherwise mentioned in particular embodiments, examples discussed herein will generally refer to sensor elements 114 comprising ordinary Hall plates, though these examples are not limiting with respect to other embodiments or the claims.

The number and arrangement of sensor elements 114 can vary in embodiments, with several example embodiments depicted in FIGS. 2A-2D. The embodiment of FIG. 2A comprises three sensor elements 114a, 114b, 114c arranged on primary surface 112 of die 110. As discussed elsewhere herein, primary surface 112 can be upwardly or downwardly facing in embodiments, depending upon the particular configuration implemented. Sensor elements 114a, 114b, 114c are arranged along a reading circle having a radius R and being concentric to the rotation axis, with PRA representing the projection of the rotation axis on die 110. Adjacent sensor elements 114a and 114b, and 114b and 114c, and 114c and 114a, are equidistantly spaced, by 120 degrees (360 degrees/3) along the reading circle in FIG. 2A. In other embodiments, more sensor elements can be used, e.g., four sensor elements spaced apart by 90 degrees (360 degrees/4), or five sensor elements spaced apart by 72 degrees (360 degrees/5), or N sensor elements spaced apart by 360 degrees/N, etc. Additionally, the particular angular position of the sensor elements in FIG. 2A or any other example depicted and discussed herein can be varied in other embodiments (e.g., sensor elements 114a, 114b, 114c can each be rotated by 20 degrees along the reading circle in FIG. 2A, etc.). In operation, sensor elements 114 can be used in a spinning current or voltage scheme to cancel out offset error, which can be of particular benefit in embodiments in which sensor elements 114 comprise Hall effect elements though is not required.

Figure 2A:
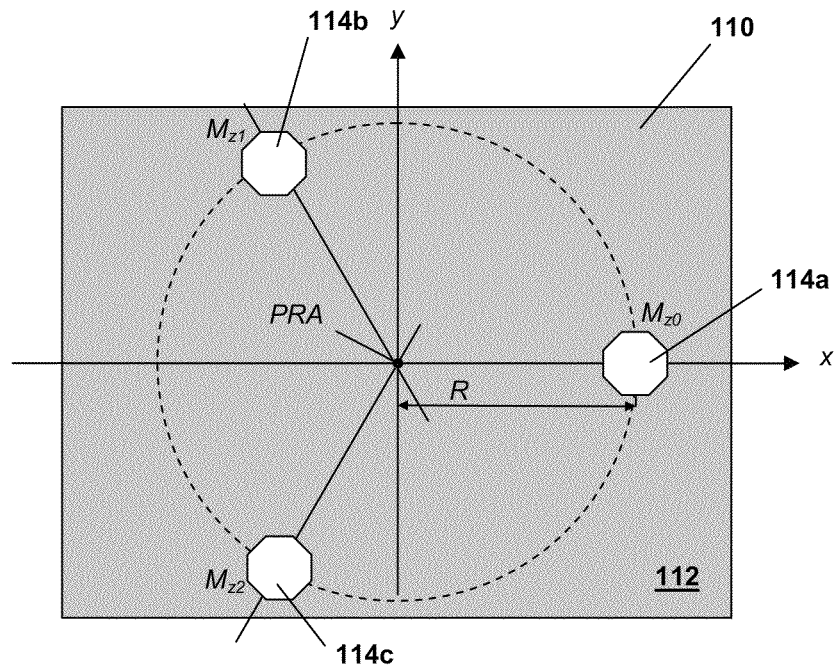
FIG. 2A is a plan view of a sensor die and sensor elements according to an embodiment.
Figure 2B:
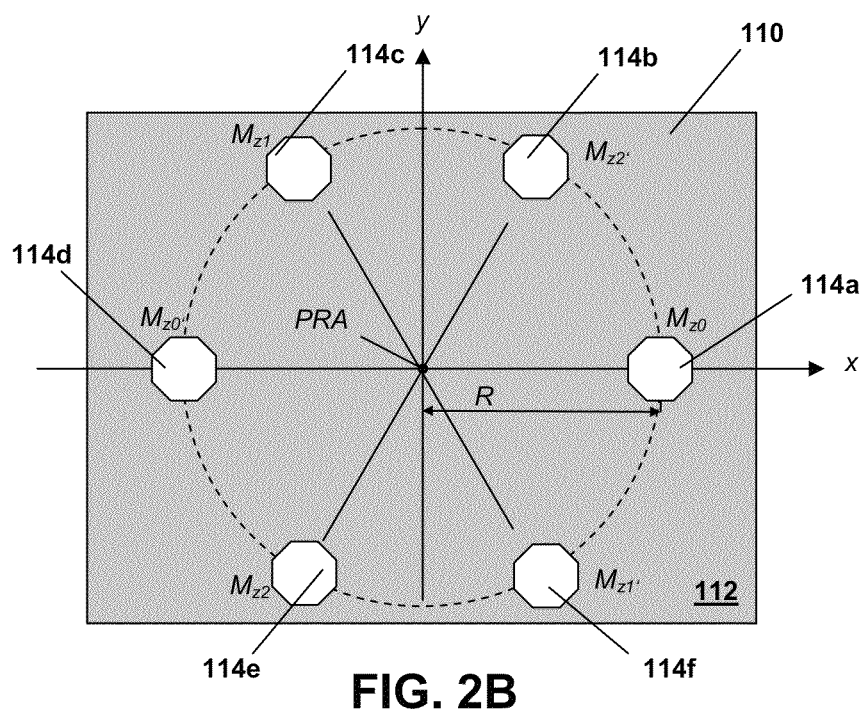
FIG. 2B is a plan view of a sensor die and sensor elements according to an embodiment.

Another arrangement is depicted in FIG. 2B, in which six sensor elements 114a-114f are equidistantly arranged on the reading circle on surface 112 of die 110, with pairs of sensor elements (e.g., 114a and 114d, 114b and 114e, etc.) being diametrically opposed with one another. Such an arrangement can provide improved rejection of background (i.e., disturbance) magnetic fields, especially if two sensor elements 114 of a pair detect a difference of magnetic field components or magnetic angle (i.e., the angle between a magnetic field vector and a reference direction, whereby the magnetic field vector can be the projection of the magnetic field on the xy-plane).

Figure 2C:
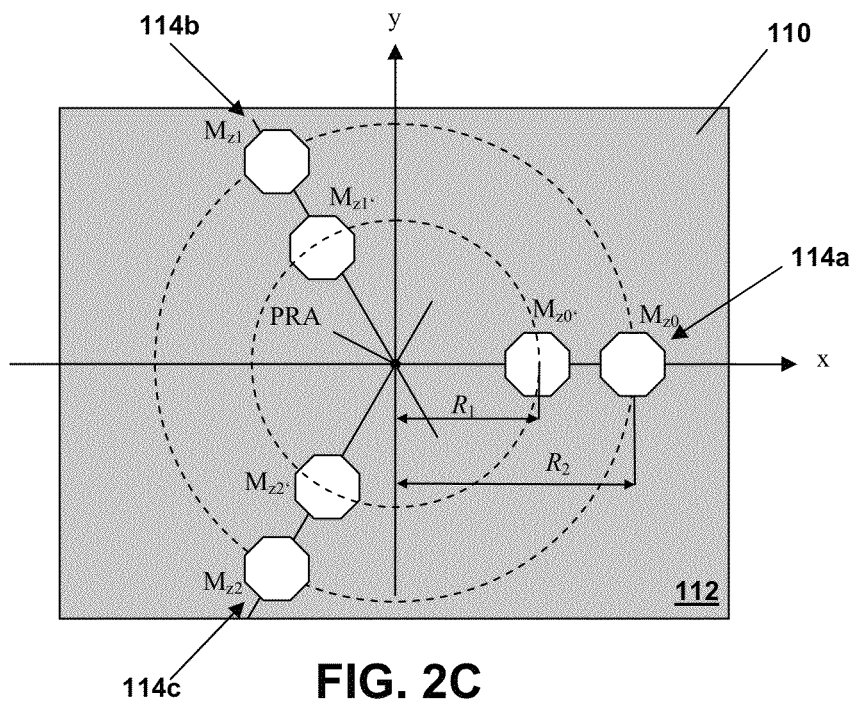
FIG. 2C is a plan view of a sensor die and sensor elements according to an embodiment.

Yet another arrangement is depicted in FIG. 2C in which pairs of sensor elements are arranged on two concentric reading circles having different diameters. Each pair 114a, 114b, 114c comprises two sensor elements, with a first sensor element arranged on an outer reading circle having a radius R2 and a second sensor element arranged on an inner reading circle having a radius R1, with R1<R2. In operation, system 100 can combine (i.e., subtract) the signals of each pair to obtain a single signal for each pair 114a, 114b, 114c. Such an arrangement can reduce effects of sensor mismatch and background magnetic fields.

Figure 2D:
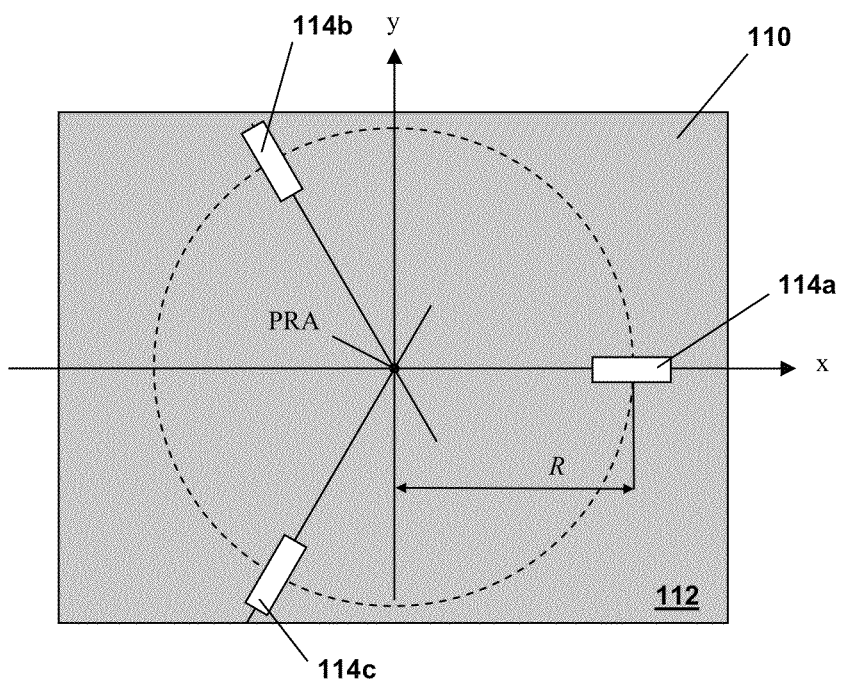
FIG. 2D is a plan view of a sensor die and sensor elements according to an embodiment.

Still another example embodiment is depicted in FIG. 2D in which sensor elements 114a, 114b, 114c comprise vertical Hall devices or magnetoresistive (e.g., AMR, TMR, GMR, CMR, etc.) devices that are sensitive to magnetic field components parallel to surface 112 (i.e., perpendicular to the rotation axis). The arrangement of FIG. 2D is similar to that of FIG. 2A, with three sensor elements spaced apart along the reading circle every 120 degrees. In FIG. 2D, however, sensor elements 114a, 114b, 114c are sensitive either to the Bpsi (i.e., azimuthal) or Br (i.e., radial) component of the magnetic field. In another embodiment, sensor elements 114 have identical sensitivity directions at two or more sensor element locations, e.g., all sensor elements 114 can be aligned to detect the Bx component. Any two orientations (e.g., x- and y-alignment) can be transformed into one another by a simple coordinate transformation if the azimuthal positions of the sensor elements are known.

In an embodiment in which each sensor element 114a, 114b, 114c of FIG. 2D comprises a magnetoresistor, each element 114a, 114b, 114c depicted in FIG. 2D can comprise a half-bridge circuit of two coupled magnetoresistors having different reference directions. In the case of GMR, CMR and TMR elements, clockwise and counter-clockwise, or radially inward and outward, reference directions of the pinned layers of the magnetoresistors could be used, while for AMR elements radial and tangential reference directions of current flow (e.g., via Barber poles) can be used. In other embodiments, full-bridge circuits can be used, which can double the signal swing and reduce the common mode signal at the sensor element-level.

Still other variations and configurations can be implemented in other embodiments. For example, in another embodiment, at least one sensor element is arranged on PRA, i.e., in line with or "on" the rotation axis. One common characteristic of the examples of FIGS. 2A-2D is that all of the sensor elements are arranged on a single die. While this can provide advantages with respect to accuracy and position tolerances and cancellation of non-linearities and background magnetic fields, it need not be the case in other embodiments and therefore is not limiting with respect to the claims or other configurations that may be contemplated.

Figure 3:
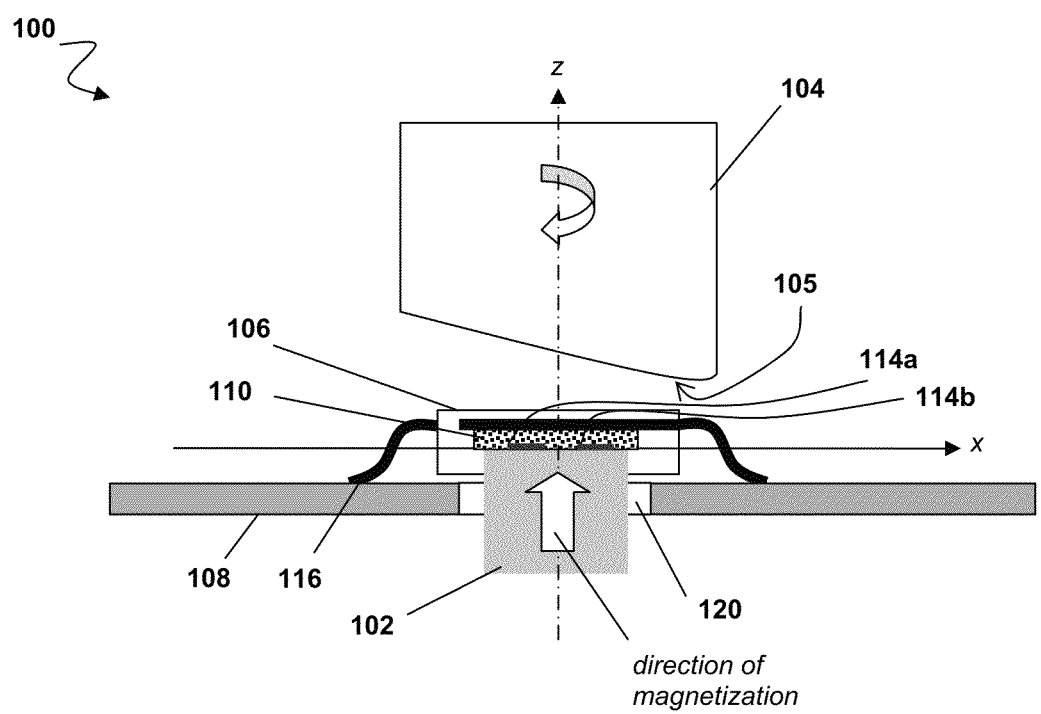
FIG. 3 is a side cross-sectional view of an on-axis magnetic field sensor system according to an embodiment.

Returning to the system-level description, of which die 110 and sensor elements 114 are parts, another embodiment of system 100 is depicted in FIG. 3. Several of the variations contemplated above are depicted in this embodiment, and the same or similar reference numerals will be used in FIG. 3 as in FIG. 1 (and herein throughout, generally) to refer to the same or similar components and features. For example, magnet 102 is coupled with die 110, which is mounted in an "upside-down" configuration. Thus, sensors 114a and 114b are downward-facing in this embodiment. Magnet 102 is also relatively smaller, having a diameter that is smaller than the x-dimension length of die 110, and is axially magnetized in the +z-direction. Die 110 is coupled to leadframe 116, though in this embodiment leadframe 116 is positioned between sensor elements 114a and 114b and shaft 104, rather than between die 110 and magnet 102 as in the embodiment of FIG. 1. This can be advantageous to protect die 110 and magnet 102 from the moving end of shaft 104.

Another difference between the embodiments of FIGS. 1 and 3 is that end surface 105 of shaft 104 in FIG. 3 has a curved, rather than flat, oblique configuration. End surface 105 also can comprise a rounded or chamfered edge along at least a portion of the circumference of the surface. This edge configuration can help to avoid collisions between parts, or to reduce the amount of damage if such collisions do occur. In FIG. 3, at least a portion visible at the lower right edge of end surface 105 is chamfered, though more or less of the circumference may be chamfered in this and other embodiments.

Figure 4:
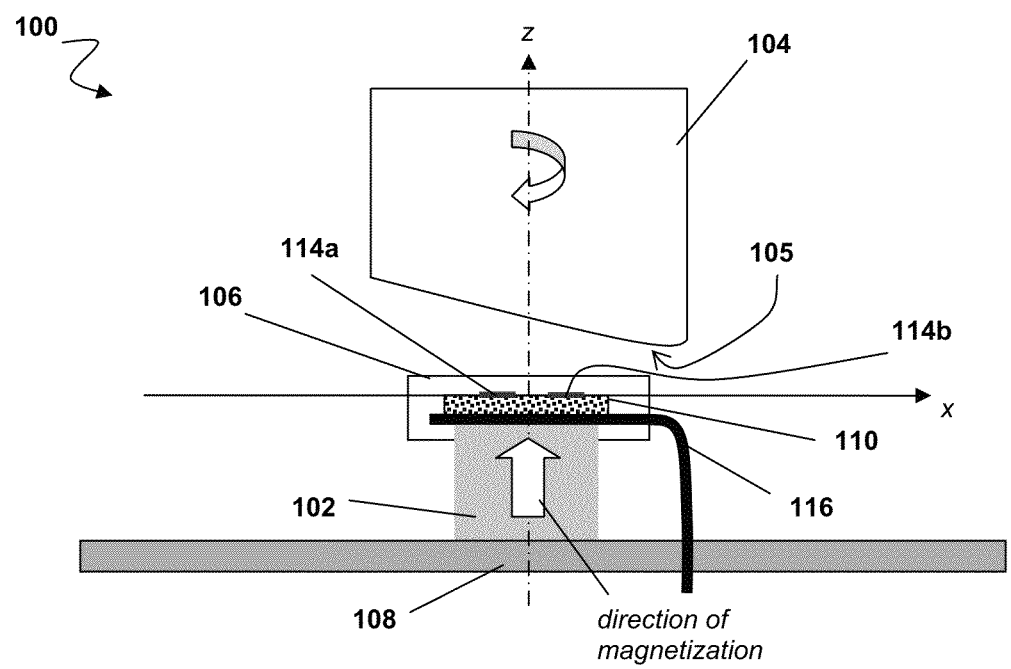
FIG. 4 is a side cross-sectional view of an on-axis magnetic field sensor system according to an embodiment.

Yet another embodiment is depicted in FIG. 4, in which the configuration of leadframe 116 and PCB 108 are altered (i.e., leadframe 116 is longer, and aperture 120 in PCB 108 is omitted) such that magnet 102 can be mounted to the topside of PCB 108, which can reduce the manufacturing costs of PCB 108. Package 106 then can comprise a through-hole-type package, enabling magnet 102 to be coupled to leadframe 116 therewithin. Die 110 and sensor elements 114a and 114b are arranged similarly to those of the embodiment of FIG. 1, with the sensor elements 114a and 114b upwardly facing, i.e., toward shaft 104. Shaft 104 can be configured as in either previously depicted embodiment, or according to some other configuration, but as depicted in FIG. 4 is similar to shaft 104 of FIG. 3, in which end surface 105 comprises a curved oblique configuration having an at least partially chamfered edge.

Figure 5A:
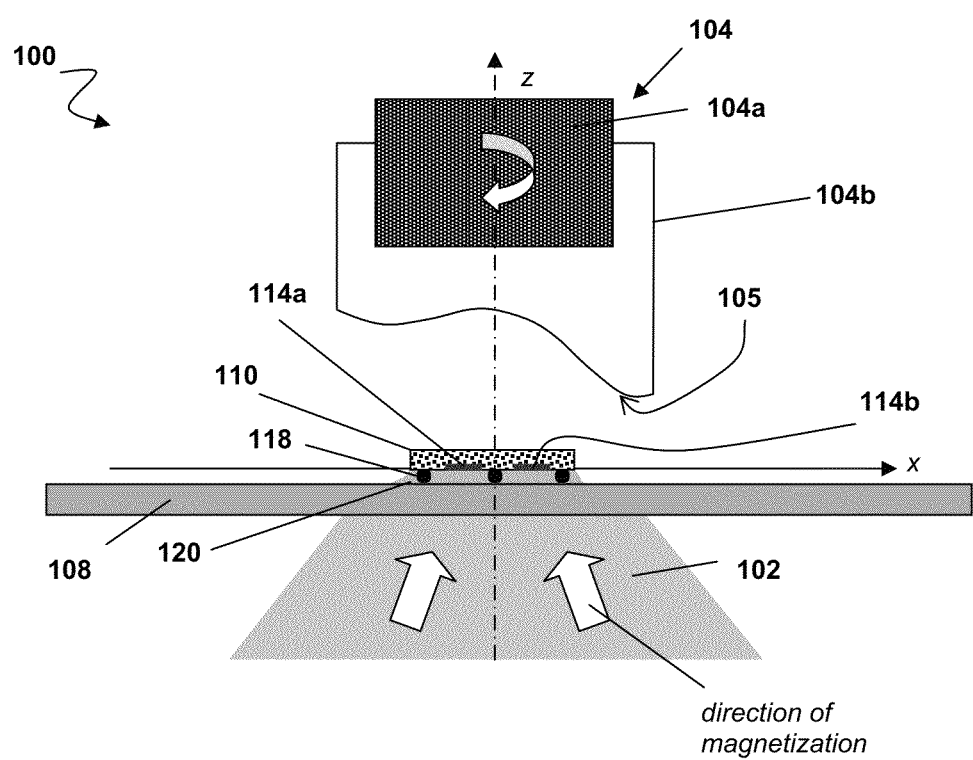
FIG. 5A is a side cross-sectional view of an on-axis magnetic field sensor system according to an embodiment.

FIG. 5A depicts another embodiment in which a main elongated portion 104a of shaft 104 comprises a non-ferrous, non-magnetic material. To have an effect on the magnetic field that can be detected by sensor elements 114a and 114b during rotation of shaft 104 in operation, shaft 104 comprises a magnetic end portion 104b. Magnetic end portion 104b can comprise a sleeve, cap or other element or structure that is coupled to or formed on or in shaft 104. In the embodiment of FIG. 5A, end portion 104b comprises a sleeve-like structure presenting a rotationally asymmetric end surface 105, similar to that of other embodiments. Here, end surface 105 has a curved oblique configuration, rather than a flat oblique configuration depicted in other embodiments. This configuration can be, e.g., the intersection of two generally cylindrical surfaces, with one cylinder axis being the z-axis and the other cylinder axis being different from the z-axis. For example, the second axis can be the y-axis, or it can be rotated around the x-axis such that it intersects the drawing plane perpendicular to the x-axis but not perpendicular to the z-axis. Some or all of a circumference of end portion 105 also can be chamfered in embodiments, as discussed herein above or modified (e.g., chamfered at a portion other than a circumferential portion) according to a particular configuration of end surface 105.

System 100 of FIG. 5A also comprises an alternate configuration of magnet 102, which here can have a truncated conical shape, i.e., magnet 102 is still generally cylindrical except that its sidewalls taper such that the bottom surface has a larger diameter than the top surface (as oriented on the page in FIG. 5A). Magnet 102 is magnetized as indicated by the arrows in FIG. 5A, a combination of radially and axially. Other configurations and magnetizations can be implemented in other embodiments.

Magnet 102 is separated from die 110, which is arranged in an upside-down, flip-chip configuration with sensor elements 114a and 114b on the surface facing away from shaft 104 and toward PCB 108 and magnet 102, by PCB 108. Die 110 is coupled to PCB 108 by contacts 118, which can comprise bumpers, balls, beads or other suitable devices and are generally surrounded by underfill 120 in embodiments. Other suitable coupling devices, features and/or methodologies can be used in this and other embodiments, according to the configuration implemented and technologies used.

Figure 5B:
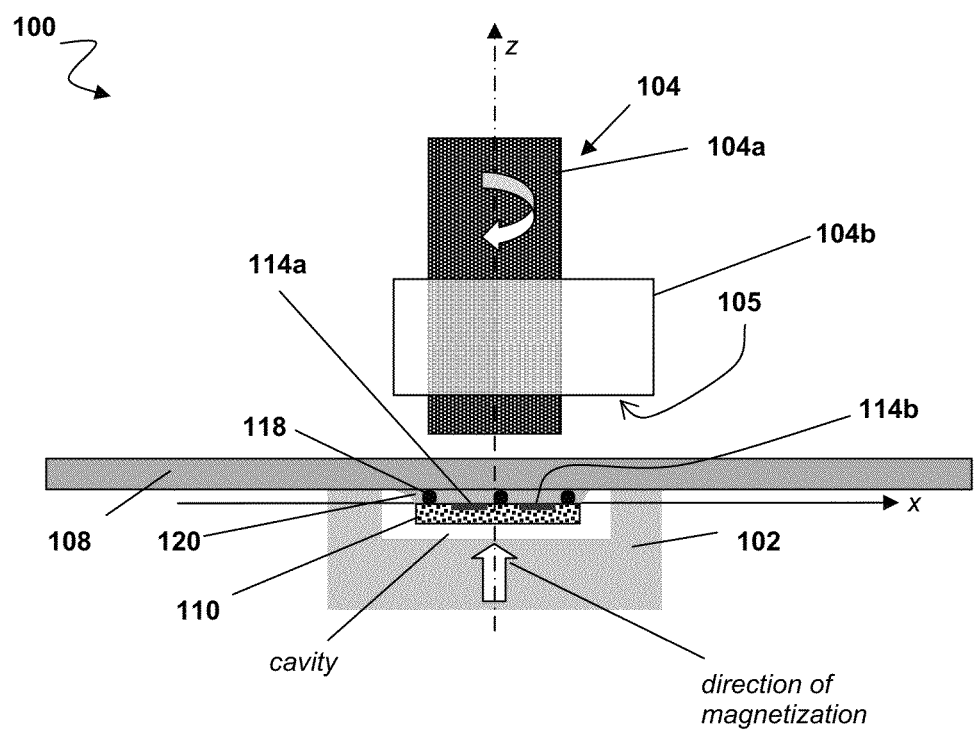
FIG. 5B is a side cross-sectional view of an on-axis magnetic field sensor system according to an embodiment.

In FIG. 5B, system 100 also comprises an end portion 104b coupled to shaft 104a. As depicted, the end of shaft 104a is closer to sensors 114 than end surface 105 of end portion 104b, though in other embodiments end portion 104b (and thereby end surface 105) can be arranged closer to sensor elements 114 than the end of shaft 104a. In embodiments, end portion 104b is magnetic, such as comprising a soft magnetic material, while shaft 104a is non-magnetic, though other configurations can be implemented in other embodiments. End portion 104b comprises a block, bar, plate (e.g. circular plate), or other suitable structure comprising a bore in or through which shaft 104a is coupled. The bore can be centered or symmetric in end portion 104b or off-centered, as in FIG. 5B. In still other embodiments, the bore can be centered or symmetric but sized or otherwise configured such that end portion 104b is asymmetric with respect to the axis of rotation once coupled with shaft 104a. In FIG. 5B, end portion 104b is asymmetric with respect to the rotation axis, and this asymmetry distorts the magnetic field generated by magnet 102. Both die 110 and magnet 102 are arranged on the side of PCB 108 that faces away from the moving shaft 104 in order to protect them in case of an accidental collision. Magnet 102 also can comprise a cavity that accommodates die 110 such that magnet 102 protects die 110 from environmental influences.

Figure 5C:
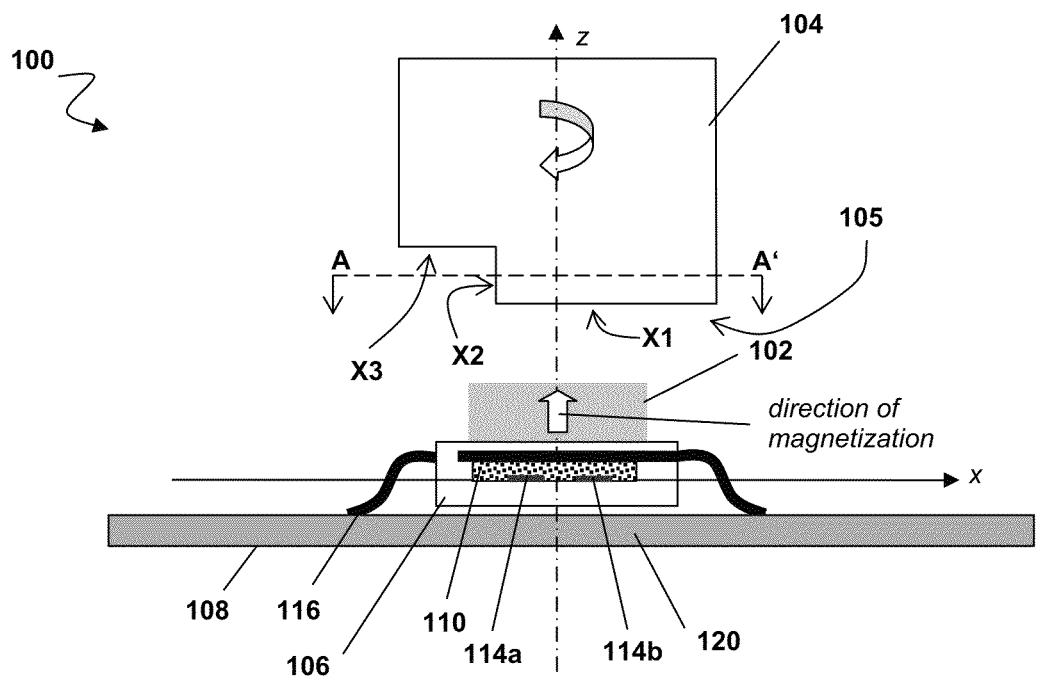
FIG. 5C is a side cross-sectional view of an on-axis magnetic field sensor system according to an embodiment.
Figure 5D:
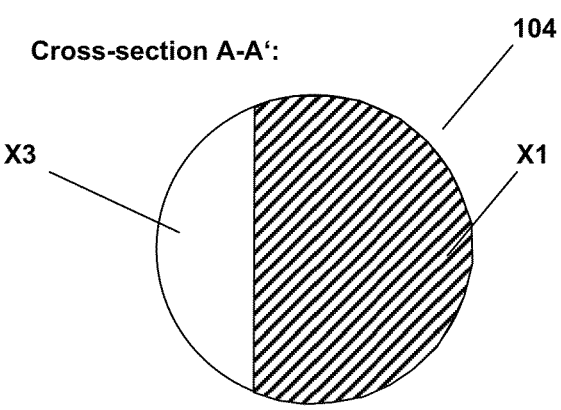
FIG. 5D is a cross-sectional view of the shaft of FIG. 5C.

FIGS. 5C and 5D depict an embodiment of system 100 with shaft 104 having a differently configured end surface 105, similar to that which is often used to couple tooth wheels, couplings or other shafts by milling off a portion of the end of shaft 104. End surface 105 comprises surface X1 being generally flat and perpendicular to the rotation axis, surface X2 being generally parallel to the rotation axis, and surface X3 being generally parallel to X1. In other embodiments, surface X1 can comprise an oblique angle as in surface 105 of FIG. 1. Magnet 102 is coupled to the top of package 106; although this can increase the spacing between sensor elements 114a, 114b and shaft 104, it can provide lower assembly costs since both magnet 102 and package 106 are mounted to the same side of PCB 108. Surface X2 is not on the rotation axis, which can be in order to provide magnetic signals that are unique in the full 360° range of shaft 104.

Figure 5E:
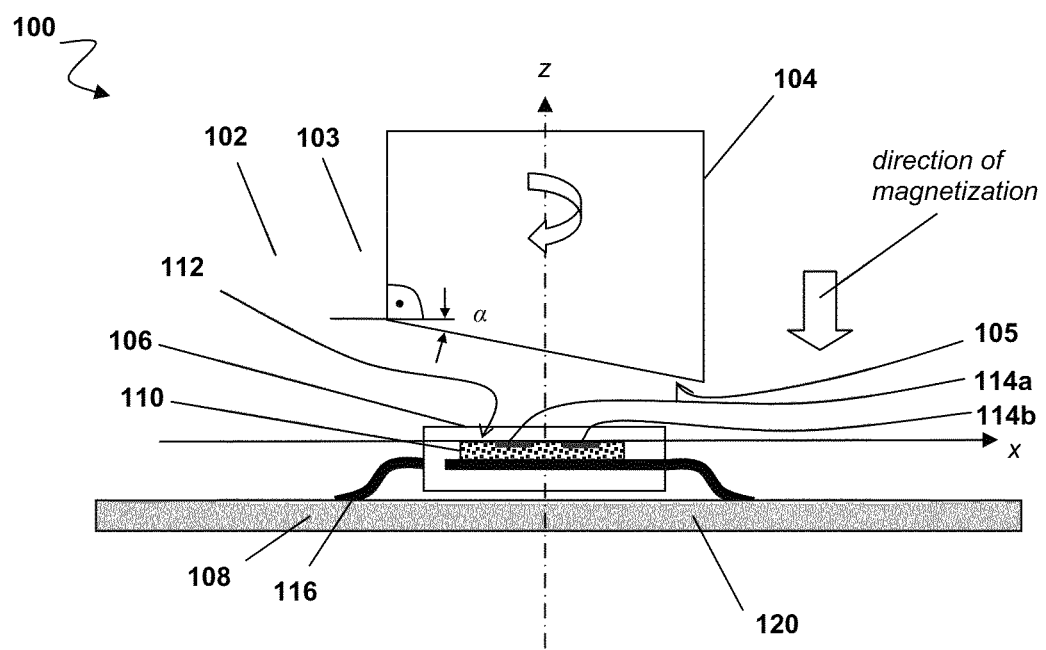
FIG. 5E is a side cross-sectional view of an on-axis magnetic field sensor system according to an embodiment.

In the embodiment of FIG. 5E, system 100 includes a configuration of magnet 102 coupled to PCB 108 and including bore 103 that accommodates package 106 and end surface 105 of shaft 104. The geometry and the magnetization of magnet 102 can be rotationally symmetric with respect to the rotation axis. End surface 105 of shaft 105 breaks this symmetry, which leads to an asymmetric magnetic field pattern on the surface of die 110 that can be detected by sensor elements 114a, 114b. System 100 can determine the rotation angle from this field distribution.

Figure 6:
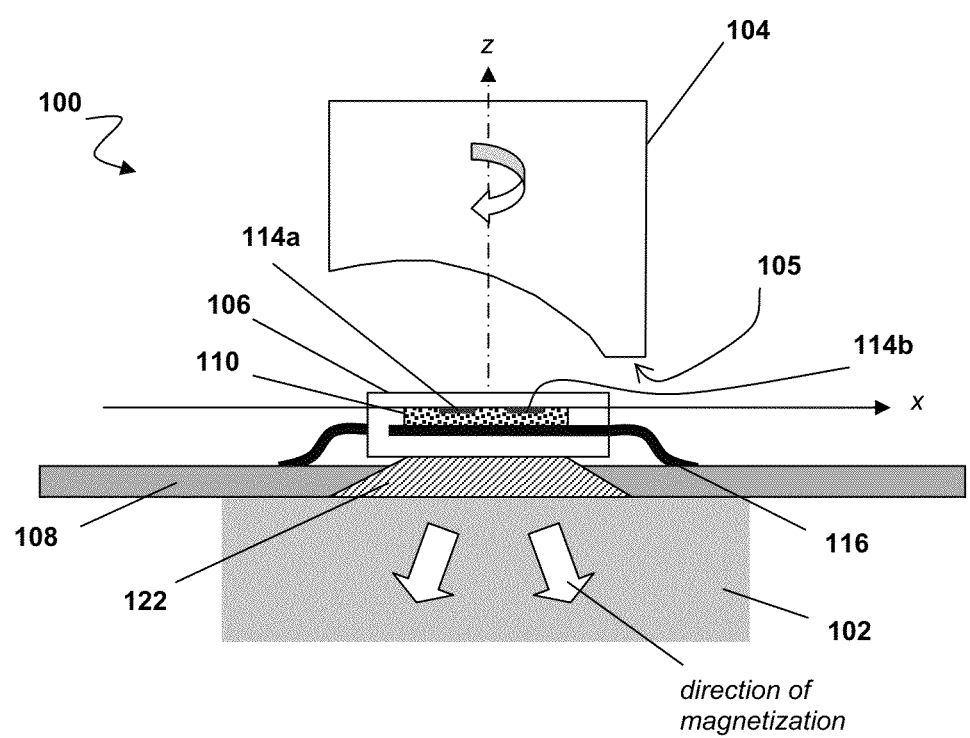
FIG. 6 is a side cross-sectional view of an on-axis magnetic field sensor system according to an embodiment.

In the embodiment of FIG. 6, a ferrous flux concentrator 122 is coupled between magnet 102 and package 106, via a through-hole of or otherwise integrated in PCB 108. Similar to the configuration of magnet 102 in the embodiment of FIG. 5, flux concentrator 122 can comprise a truncated conical configuration, with PCB 108 adapted to accommodate concentrator 122 accordingly. In the embodiment of FIG. 6, flux concentrator 122 is taller or longer than the thickness of PCB 108, such that when package 106 is coupled to flux concentrator 122 a gap exists between the side portions of package 106 and PCB 108, where the width of package 106 is greater than a diameter or width of the top surface of flux concentrator 122. In other embodiments, flux concentrator 122 and PCB 108 can be configured such that the bottom surface of package 106 is flush with PCB 108 and flux concentrator 122 across the entire width (or along the entire bottom surface) of package 106. In general, however, flux concentrator 122 will be configured, sized and arranged in order to concentrate or guide magnetic flux on or to sensor elements 114a and 114b.

Magnet 102 comprises a cylinder magnet, as in other embodiments, though magnet 102 can be much larger than that depicted in other embodiments. Along with flux concentrator 122, magnet 102 also can comprise a less strongly magnetized, and therefore less expensive, magnet in embodiments. As depicted in FIG. 6, magnet 102 is magnetized in a combination axial and radial manner, though as previously mentioned the magnetization can vary in other embodiments.

As in other embodiments, shaft 104 comprises end surface 105 that is rotationally asymmetric with respect to the rotation axis. In the embodiment of FIG. 6, at least a portion of end surface 105 is generally parallel with a surface of die 110 on which sensor elements 114a and 114b are mounted, while another portion comprises a curved oblique surface.

Figure 7:
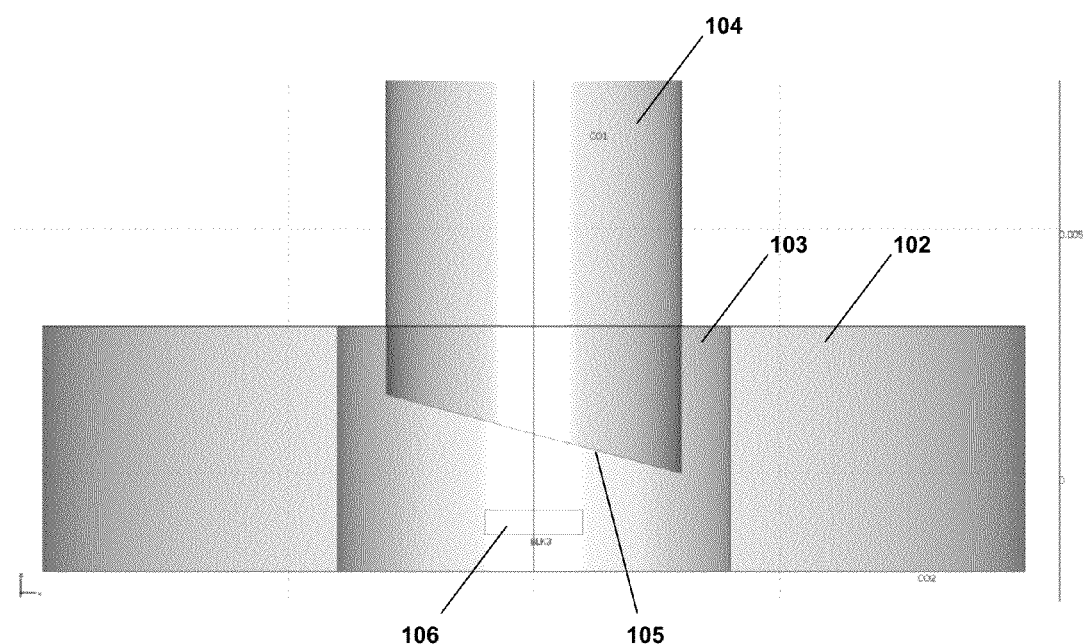
FIG. 7 is a semi-transparent side view of a ring magnet, shaft and sensor package arrangement according to an embodiment.

In the embodiments of FIGS. 1 and 2-5 discussed above, magnet 102 was generally depicted as comprising a solid volume. In these and other embodiments, however, magnet 102 can instead comprise a ring or other shape comprising a void or aperture that passes at least partially through the volume. One example of such a magnet 102 is depicted in FIG. 7. Magnet 102 comprises a radially symmetric ring-shaped magnet that can be axially and/or radially magnetized in embodiments and comprises a central bore 103. Shaft 104 extends into bore 103 such that oblique end surface 105 rotates therewithin in operation. The extent to which shaft 104 extends into bore 103 can vary in embodiments but generally will be to such an extent that the entirety of oblique end surface 105 remains within bore 103 during rotation, even if there is some axial play or wobble of shaft 104 overall. This can increase the robustness of the magnetic field acting on the sensor elements in sensor package 106, including with respect to position tolerances. Sensor package 106 also can be arranged within bore 103, proximate end surface 105. Other elements and circuitry (e.g., leadframe, PCB, etc.) to couple package 106 to other system components are not depicted in FIG. 7, but those skilled in the art will recognize this coupling can be implemented in various suitable ways.

In other embodiments, one or both of package 106 and end surface 105 can be arranged proximate to magnet 102 but not within bore 103. Other features, characteristics and components also can vary in other embodiments. For example, the particular non-radially symmetric configuration of end surface 105 can vary from that depicted and be curved, chamfered, or otherwise vary as discussed herein with respect to any other embodiment.

Figure 8:
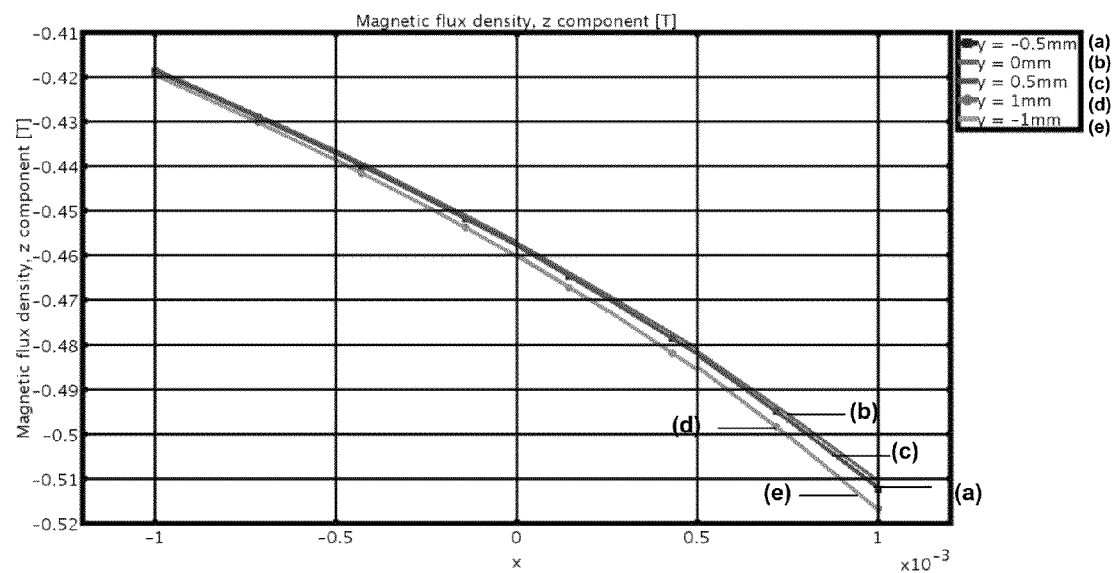
FIG. 8 is a plot of simulation results for an embodiment similar to that of FIG. 7.

A computer simulation of the embodiment of FIG. 7 was run, and the results are depicted in FIG. 8. In this simulation, the following characteristics were used:

Shaft 104: diameter 6 mm
   length 20 mm (from z=0 to z=20 mm)
   oblique end surface 105 α=15 degrees
Magnet 102: permanently, axially magnetized
   outer diameter 20 mm, inner diameter 8 mm (bore 103)
   arranged at z=−2 mm to +5.5 mm
   Brem, z=1T
Die 110: 1 mm by 1 mm by 0.5 mm
   top surface arranged at z=−0.75 mm
   bottom surface arranged at z=−1.25 mm
Steel back plane arranged perpendicular to the rotation axis
   between z=−4 mm to −3 mm
Shaft 104 and back plane: μr=1,600
Air volume: 40 mm diameter and 24 mm height (boundary conditions: magnetic isolation)

The plot of FIG. 8 shows the axial magnetic field scanned along a path parallel to the x-axis on the top surface of package 106 as depicted in FIG. 7. A significant common mode field of Bz=−0.456*Brem at x=0 and a difference in the Bz field at x=+/−0.5 mm of 0.044*Brem. The system has to remove a large common mode Bz field on which a small difference in the Bz field is superimposed (e.g., about 10% of the common mode field). The magnetic field also is not exactly linear, as a slight curvature of Bz can be seen at each y-position plot versus x in FIG. 8. The magnitude of the common mode field and the curvature can be adjusted in wide ranges in embodiments by moving magnet 102 along the axial (i.e., z-axis) position. If the bottom (referring to the orientation depicted in FIG. 7) of magnet 102 is near the end of end surface 105, the ratio of magnetic field difference at x=+/−0.5 mm over common mode magnetic field (at x=0 mm) can be maximized and the curvature of the curve minimized.

Figure 9A:
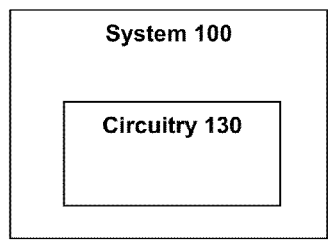
FIG. 9A is a conceptual block diagram of a sensor system comprising circuitry according to an embodiment.
Figure 9B:
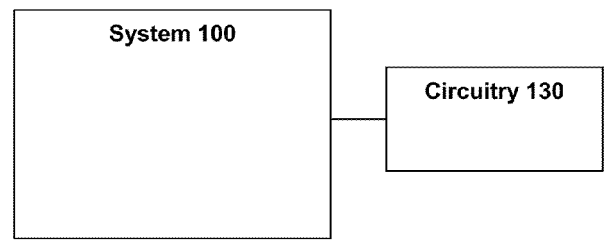
FIG. 9B is a conceptual block diagram of a sensor system coupled to circuitry according to an embodiment.

In operation, shaft 104 rotates, which affects the magnetic field induced by magnet 102 and sensed by sensor elements 114 because of the variations introduced by non-rotationally symmetric end surface 105 as shaft 104 rotates. Referring also to FIGS. 9A and 9B, circuitry 130 coupled to sensor elements 114, which can comprise part of (FIG. 9A) or otherwise be coupled to (FIG. 9B) system 100, can estimate a rotational position of shaft 104 based on the magnetic field signals of sensor elements 114. There are many different ways in which the rotational position can be estimated or determined.

In a first example, sensor elements 114 are arranged as depicted in FIGS. 2A-2C (i.e., N sensor elements arranged on a reading circle concentric to the axis of rotation of shaft 104 and spaced apart by 360/N) and are sensitive to the axial component of the magnetic field. Sensor elements 114 can have an output signal that is a power series of the axial magnetic field:

$$Sig = \sum_{m=0}^{\infty} c_m B_z^m$$

Here, $c_0$ is the offset of the sensor element, which is the output signal at vanishing magnetic field; $c_1$ is the linear magnetic sensitivity, and $c_m$ (with m>0) are higher-order terms that account for the nonlinearity of the sensor element. It can be assumed that the linear magnetic sensitivity is larger than the higher order terms, which means that the nonlinearity of the sensor element is only small or moderate. Given the symmetry of magnet 102 and non-rotationally symmetry of end surface 105, the axial magnetic field can be expressed in a circular cylindrical reference frame as $$B_z(R, \psi, z) = \sum_{n=0}^{\infty} b_n(R) \cos(n(\psi - \psi_0))$$

where $b_0(R)$ denotes the large common mode field and $\psi_0$ is the rotational position of shaft 104. If a scan along x of the axial field component in FIG. 8 would be a straight line according to $B_z = \overline{b_0} + \overline{b_1} x$ with the rotation $$\begin{pmatrix} x \\ y \end{pmatrix} = \begin{pmatrix} \cos\psi_0 & \sin\psi_0 \\ -\sin\psi_0 & \cos\psi_0 \end{pmatrix} \begin{pmatrix} x' \\ y' \end{pmatrix},$$

this gives $B_z = \overline{b_0} + \overline{b_1} R \cos(\psi - \psi_0)$. In other words, for a straight line $b_0$ is constant versus radial distance and $b_1$ is linearly proportional to radial distance with all other terms vanishing. Thus, circuitry 130 can extract the $\cos(\psi - \psi_0)$ term and suppress all other terms in order to estimate the rotational position of shaft 104. As depicted in FIG. 8, however, the field scanned along the x-axis is not a straight line but exhibits some curvature, giving rise to terms proportional to $\cos 2(\psi - \psi_0)$, $\cos 3(\psi - \psi_0)$, etc. Thus, for a more accurate angle measurement, the sensor arrangements of FIG. 2 and the circuitry that processes the signals therefrom can extract the $\cos(\psi - \psi_0)$ term and suppress all others.

An example is depicted in FIGS. 10A-10C, in which the axial (Bz), azimuthal (Bpsi) and radial (Br) magnetic field components in the z=−0.75 mm sensing plane of FIG. 7 are sampled along several reading circles (radii=0.1 mm, 0.3 mm, 0.5 mm, 0.7 mm and 0.9 mm). As can be seen in FIG. 10A, the signal swing for Bz increases as the reading circle radius increases (i.e., between about −0.505 and −0.423 for a reading circle radius of 0.9 mm, versus between only about −0.462 and −0.453 for 0.1 mm reading circle radius), though diameter can be limited by available or suitable die size, which in turn can be limited most often by system cost.

Figure 10E:
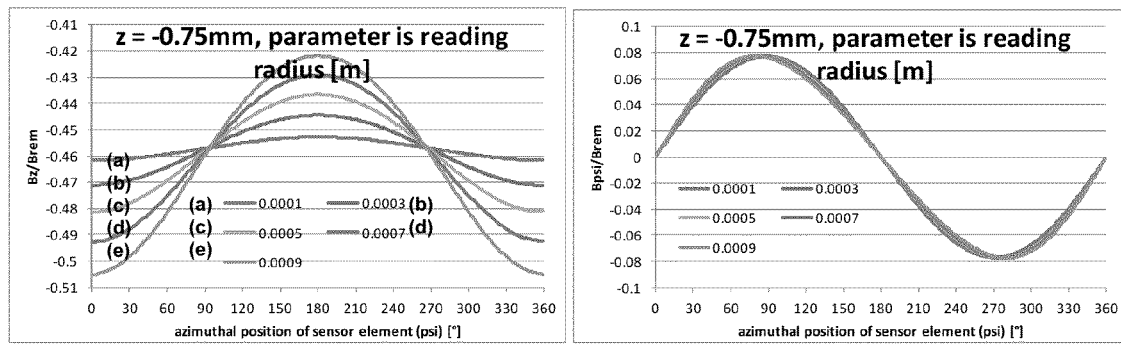
FIG. 10E is a plot of sensor element signals at various azimuthal sensor element positions according to an embodiment.
Figure 10E:
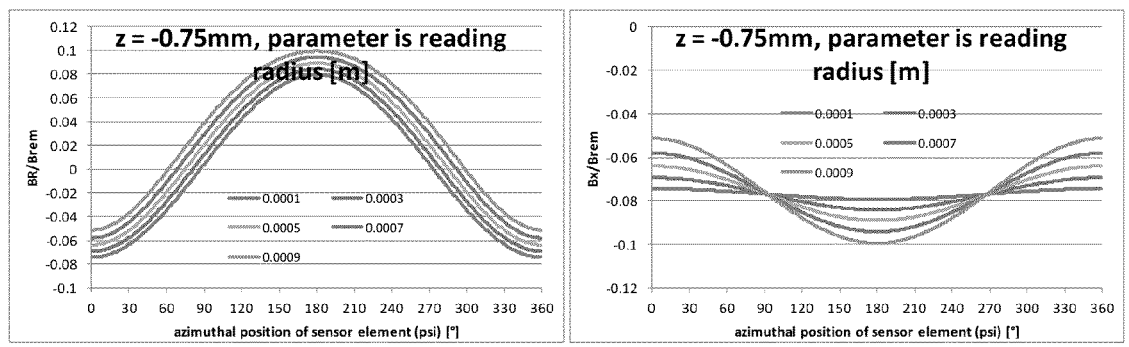
Figure 10E:
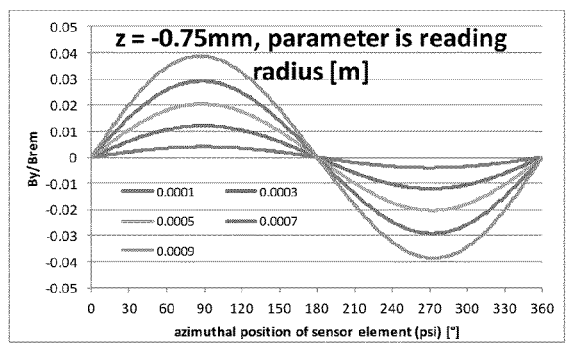

Conversely, the signal swing of the radial and azimuthal components does not depend much on the radial distance of sensor elements 114 from the rotation axis. The azimuthal component has a vanishing average value over one revolution, whereas the radial component has an average value smaller than the amplitude, and the axial component has an average value much larger than the amplitude. Since the average value gives rise to angle errors due to mismatch of sensor elements 114 and reduces the useful signal swing because of necessary headroom for drifts of the average value, the azimuthal field component can be best suited for an angle sensor and the axial component is less suited for an angle sensor. Nevertheless, this disadvantage of the axial component can be compensated for by the better performance of sensor elements 114 comprising Hall plates sensitive to axial components when compared with less good vertical Hall devices or magneto-resistors, as both of these sensor types have larger zero point errors than Hall plates. Other embodiments of sensor systems can use sensor elements 114 that detect Bx components as shown in FIG. 10D. Alternatively, sensor systems can use sensor elements 114 that detect By components as shown in FIG. 10E.

In embodiments, system 100 can sample the signals $Sig(R, \psi_m)$ with $\psi_m = 2\pi m/N$ for m=0, 1, ... N−1 with the N sensor elements on the reading circle, and compute a discrete Fourier transform:

$$\sigma_n = \sum_{m=0}^{N-1} Sig(R, \psi_m) \exp(2\pi j m n / N)$$

with the imaginary unit $j = \sqrt{-1}$. The weighing coefficients $\exp(2\pi j m n/N)$ of this sum are complex valued, yet this complex sum can be re-written as a set of two real-valued sums:

$$\text{Re}\{\sigma_n\} = \sum_{m=0}^{N-1} Sig(R, \psi_m) \cos(2\pi m n / N) \text{ and}$$

$$\text{Im}(\sigma_n) = \sum_{m=0}^{N-1} Sig(R, \psi_m) \sin(2\pi m n / N).$$

The angle between the complex pointer $\sigma_n$ with n=1 and the positive real axis is the angular position of shaft 104. It can be obtained by $\psi_0 = \arctan_2(\text{Re}\{\sigma_n\}, \text{Im}\{\sigma_n\})$ which can be implemented by a CORDIC algorithm or numerous other ways appreciated by those skilled in the art. Note that this Fourier transform represents an algorithm that has the desired property to extract the $\cos(\psi - \psi_0)$ term and suppress terms proportional to $\cos 2(\psi - \psi_0)$, $\cos 3(\psi - \psi_0)$, etc., as discussed above.

In embodiments, system 100 and/or circuitry 130 also can consider transient effects. If the number N of magnetic sensor elements 114 is large and the angular velocity of shaft 104 is high, signal propagation can become problematic. In the simplest case, circuitry 130 has N parallel signal channels, each one sampling and processing the signal of a single magnetic sensor element 114. It can be sufficient or advantageous in embodiments if all of the signal channels are synchronized so that they sample the signals simultaneously. System 100 then can wait for the slowest channel and perform the computation of the Fourier sum with subsequent derivation of angle $\psi_0$.

The output result is available with a certain lag in time but can avoid any angle error related to signal propagation.

In some embodiments, however, such as those which are lower cost, system 100 can have fewer resources, e.g., there are fewer signal paths than sensor elements 114. In one particular example, there could be only a single signal path which has to process all N sensor signals in a time-multiplexed manner. This can be accounted for by replacing $\psi_0 \rightarrow \psi_0 + m\omega T$, where $\omega$ is the angular velocity of shaft 104 (that may be positive or negative) and T is the processing time needed to sample a signal $Sig(R,\psi_m)$ and transform it into a representative form that can be used to compute the Fourier sum (e.g., the time needed for an analog-to-digital—A/D—conversion of the signal). System 100 can be simplified by assuming that (i) the angular velocity is constant during the sampling of all N sensor elements 114, and (ii) the processing time is equal for all N sensor elements 114. In the simplest case this gives $$B_z(R,\psi_m) = \overline{b_0} + b_1 R \cos(\psi_m - \psi_0 - m\omega T)$$

If sensor elements 114 are ideal Hall plates with $c_m = 0$ except for m=1, then:

$$Sig(R,\psi_m) = c_1 \overline{b_0} + c_1 \overline{b_1} R \cos(\psi_m - \psi_0 - m\omega T)$$

and the fundamental frequency of the discrete Fourier transform is $$\sigma_1 = c_1 \overline{b_1} R \sum_{m=0}^{N-1} \cos(\psi_m - \psi_0 - m\omega T) \exp(2\pi j m / N)$$

For $|\omega T| < 2\pi/3$ and N=3 the result is:

$$\sigma_1 = \kappa \{2 \cos \psi_0 + (5 + j\sqrt{3})\cos(\psi_0 + \omega T) - (1+j\sqrt{3})\cos(\psi_0 + 2\psi T) - 2\omega T) - 2\sqrt{3} \sin \psi_0 + \sqrt{3}(1+j\sqrt{3})(\sin(\psi_0 + \omega T) + \sin(\psi_0 + 2\omega T))\}$$

with $\kappa > 0$. The angle between $\sigma_1$ and the positive real axis is $\psi_0$ for $\omega T = 0$ (i.e., the ideal case where sensor system 100 is very fast compared to the rotation of shaft 104) and it is $\psi'_0 = \psi_0 - \Delta\psi_0$ for non-vanishing $\omega T$. Inserting $\psi'_0$ into the equation for $\sigma_1$ and developing the result into a MacLaurin series up to first order in $\omega T$, the angle error due to signal propagation delay is:

$$\Delta\psi_0 \cong -\omega T\left(1 + \frac{1}{2}\cos(2\psi_0) - \frac{1}{\sqrt{3}}\sin\psi_0\cos\psi_0\right)$$

For $\omega T = 3.6°$ this angle error varies sinusoidally between about $-5.6°$ and $-1.6°$, depending on the position Both the mean and the amplitude of this error vary linearly with $\omega T$. Thus, if we assume a motor speed of $\omega = 10000$ rpm and a sampling delay of T=20 μs, $\omega T \cong 1.2°$, which gives $-1.9° < \Delta\psi_0 < -0.5°$. In practice, this can be significant enough that it is not negligible.

Sensor system 100 can know or learn the propagation delay T and estimate the angular frequency $\omega$ of shaft 104 by observing angles over time. Thus, with the last equation system 100 can estimate the transient angle error and add it to the angle derived from the discrete Fourier transform. This can be a simple correction for transient angle errors that are caused by the fact that sensor elements 114 are sampled at instants in time $t_0, t_0+T, t_0+2T, \ldots, t_0+(N-1)T$ while shaft 104 rotates at constant speed $\omega$. Still other correction or compensation methodologies, or other system configurations to avoid these and other transient errors, can be implemented in other embodiments.

In embodiments generally depicted and discussed up to this point, magnet 102 and shaft 104 are decoupled, with magnet 102 being fixed with respect to the position of die 110 and therefore sensor elements 114 (e.g., via the common PCB 108, as in FIG. 1, for example). In other embodiments, such as those depicted in FIGS. 11 and 12, however, magnet 102 can be fixed to and rotate with shaft 104. In such an embodiment, there must be some clearance between magnet 102 and PCB 108. Such an embodiment can be more accurate with respect to hysteresis losses and eddy currents induced in shaft 104 because magnet 102 does not move with respect to shaft 104. This can be advantageous if the rotation direction can be reversed and the differences in angle readings between clockwise rotation and counter-clockwise rotation should be minimized. It also can be advantageous if shaft may run at very fast rotations, because this could give rise to eddy currents and a lag in the total magnetic field caused by these eddy currents if magnet 102 is at rest while shaft 104 rotates. This arrangement generally allows for more shapes of magnet, because the shape of the magnet and the distribution of its magnetization do not need to exhibit rotational symmetry. If they are not rotationally symmetric, their asymmetry simply adds to the asymmetry of end surface 105.

Figure 11:
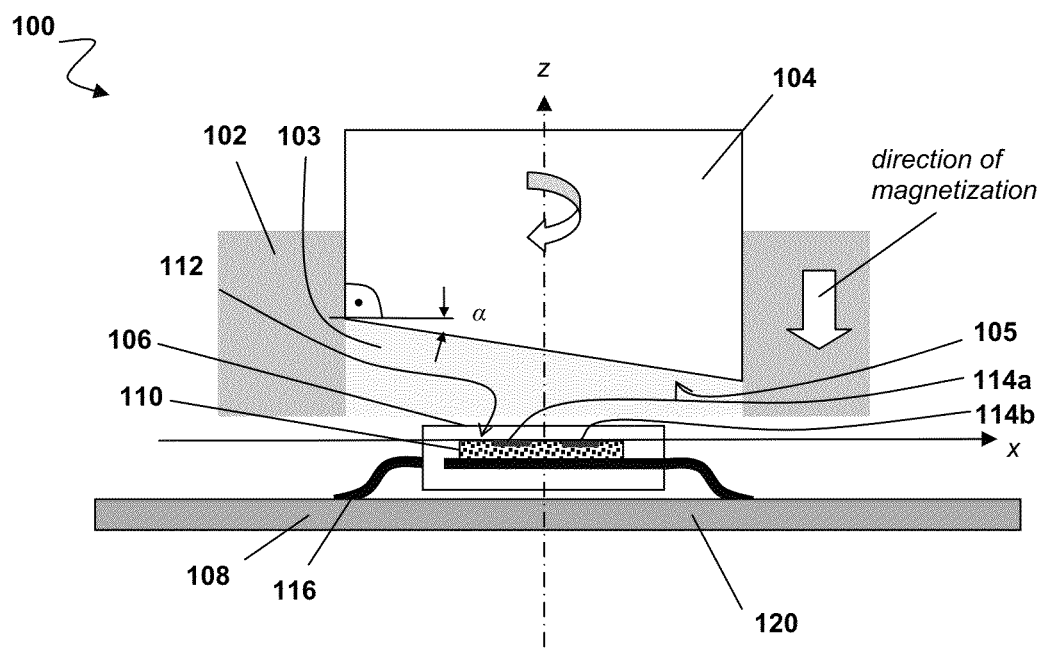
FIG. 11 is a side cross-sectional view of an on-axis magnetic field sensor system according to an embodiment.

In FIG. 11, for example, cylindrical magnet 112 is rotationally symmetric and coupled to shaft 104, with shaft 104 generally extending into bore 103 of magnet 102 such that end surface 105 is within bore 103. Alternatively, magnet 102 can be shifted so that end surface 105 of shaft 104 is at least partly outside of bore 103, or shifted so that sensor package 106 is inside bore 103. In general, magnet 102 can be shifted up or down, so long as collision or physical interference between any moving parts is avoided. The axial direction of magnetization can also be replaced by a pure diametrical magnetization aligned with the x- or y-axis or any combination thereof. Also the outer perimeter does not need to be circular and can also be square, octagonal or generally arbitrary in embodiments.

Figure 12:
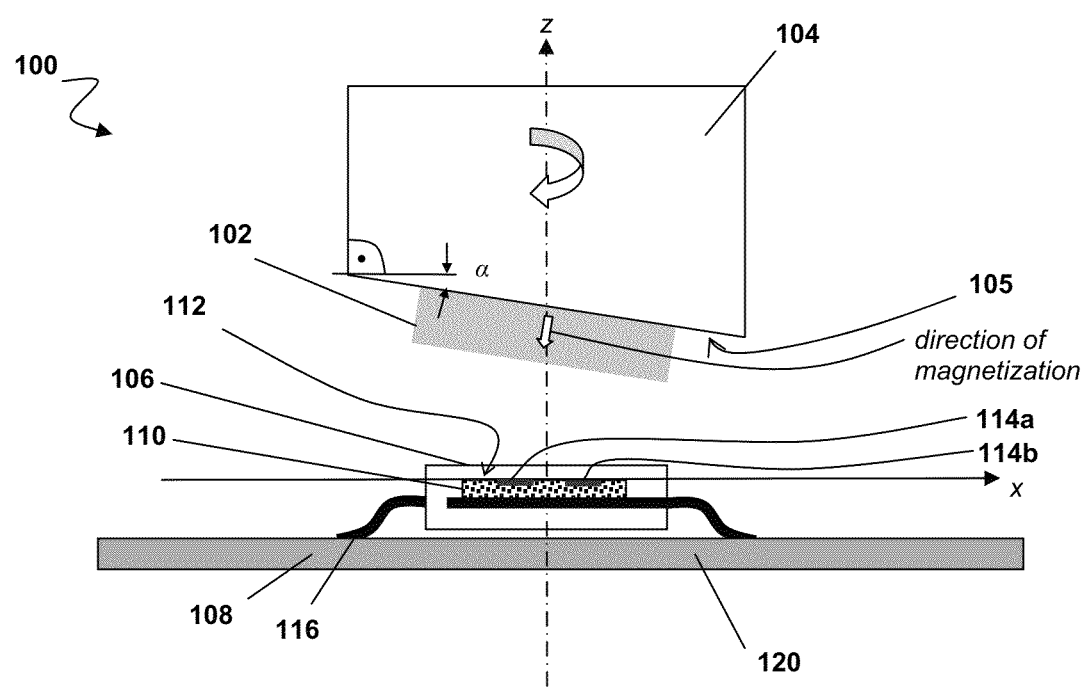
FIG. 12 is a side cross-sectional view of an on-axis magnetic field sensor system according to an embodiment.

In FIG. 12, magnet 102 comprises a generally flat circular cylinder or rectangular block that is coupled to end surface 105 of shaft 105. Magnet 102 can be magnetized perpendicular to end surface 105, though in other embodiments other magnetization patterns of arbitrary asymmetry can be implemented.

Numerous other variations, configurations and adaptations can be contemplated in other embodiments, such as to accommodate particular applications or situations. While some embodiments can be particular suitable for use in or with BLCD motors because embodiments can be robust with respect to inhomogeneous disturbance magnetic fields emitted by BLDC motors and assembly tolerances, BLCD motors are but one example application or use. Various embodiments can be used with, in or adapted for numerous other applications and situations, which is least one additional advantage.

Various embodiments of systems, devices and methods have been described herein. These embodiments are given only by way of example and are not intended to limit the scope of the invention. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the invention.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention can comprise a combination of different individual features selected from different individual embodiments, as understood by persons of ordinary skill in the art. Moreover, elements described with respect to one embodiment can be implemented in other embodiments even when not described in such embodiments unless otherwise noted. Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended. Furthermore, it is intended also to include features of a claim in any other independent claim even if this claim is not directly made dependent to the independent claim.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. A magnetic field angle sensor system comprising:
a shaft rotatable around a rotation axis;
an end portion rotatable with the shaft and being rotationally asymmetric with respect to the rotation axis;
a sensor die spaced apart from the end portion and comprising a first surface being substantially perpendicular to the rotation axis;
at least three magnetic field sensor elements arranged spaced apart from one another on the first surface around a projection of the rotation axis onto the first surface;
a magnetic field source; and
circuitry coupled to the at least three magnetic field sensor elements and configured to estimate a rotational position of the shaft by combining signals of the at least three magnetic field sensor elements when, in operation, the end portion is magnetized by the magnetic field source and alters a magnetic field sensed by the at least three magnetic field sensor elements when the end portion rotates with the shaft,
wherein the circuitry is configured to estimate a rotational position of the shaft by combining signals of the at least three magnetic field sensor elements to determine a real part Re$\{\sigma_n\}$ and an imaginary part Im$\{\sigma_n\}$ of a complex pointer $\sigma_n$ and to determine an angle between the complex pointer and a positive real axis.

2. The magnetic field angle sensor system of claim 1, wherein the magnetic field source comprises a permanent magnet.

3. The magnetic field angle sensor system of claim 2, wherein the permanent magnet has a magnetization that is axial, radial or a combination of axial and radial.

4. The magnetic field angle sensor system of claim 3, wherein the permanent magnet and the magnetization are rotationally symmetric with respect to the rotation axis.

5. The magnetic field angle sensor system of claim 2, wherein the permanent magnet comprises a bore, and wherein at least one of a portion of the end portion, the sensor die and the at least three magnetic field sensor elements are arranged within the bore.

6. The magnetic field angle sensor system of claim 1, wherein the end portion is integrally formed with the shaft or coupled to the shaft.

7. The magnetic field angle sensor system of claim 1, wherein a surface of the end portion opposite the sensor die is not perpendicular to the rotation axis.

8. The magnetic field angle sensor system of claim 1, wherein the at least three magnetic field sensor elements comprise Hall plates, vertical Hall elements, MAGFETs, or magnetoresistive elements.

9. The magnetic field angle sensor system of claim 1, wherein the at least three magnetic field sensor elements are arranged at equidistant angular positions on a reading circle concentric to the projection of the rotation axis on the first surface of the die.

10. The magnetic field angle sensor system of claim 1, wherein the magnetic field source is configured to rotate with the shaft.

11. The magnetic field angle sensor system of claim 1, wherein a distance between one of the at least three magnetic field sensor elements and a closest part of the end portion is less than about 3 millimeters (mm).

12. The magnetic field angle sensor system of claim 1, further comprising a printed circuit board (PCB), wherein at least one of the die and the magnetic field source are coupled to the PCB.

13. The magnetic field angle sensor of claim 1, wherein the circuitry is configured to estimate a transient angle error and adjust the estimated rotational position of the shaft based on the estimated transient angle error.

14. The magnetic field angle sensor of claim 1, comprising at least four magnetic field sensor elements arranged in pairs with respect to the rotation axis, wherein the circuitry is configured to combine signals of the pairs.

15. The magnetic field angle sensor of claim 14, wherein the pairs comprise two magnetic field sensor elements arranged in diametric opposition with another with respect to the rotation axis.

16. The magnetic field angle sensor of claim 14, wherein the pairs comprise a first magnetic field sensor element arranged on a first reading circle concentric to the rotation axis and having a first radius and a second magnetic field sensor element arranged on a second reading circle concentric to the rotation axis and having a second radius larger than the first radius.

17. A method comprising:
providing a shaft rotatable around a rotation axis;
altering a magnetic field by magnetizing a non-rotationally symmetric end portion of the shaft;
sensing the altered magnetic field by at least three magnetic field sensor elements arranged proximate the end portion on a surface substantially perpendicular to the rotation axis; and
estimating an angular position of the shaft by applying a discrete Fourier transform to sensed signals of the at least three magnetic field sensor elements,
wherein the angular position of the shaft is equal to an angle between a complex pointer $$\sigma_n = \sum_{m=0}^{N-1} Sig(R, \psi_m)\exp(2\pi jmn/N)$$

and a positive real axis.

18. A magnetic field angle sensor system comprising:
a shaft rotatable around a rotation axis;
an end portion rotatable with the shaft and being rotationally asymmetric with respect to the rotation axis;
a sensor die spaced apart from the end portion and comprising a first surface being substantially perpendicular to the rotation axis;
at least three magnetic field sensor elements arranged spaced apart from one another on the first surface around a projection of the rotation axis onto the first surface; and
circuitry coupled to the at least three magnetic field sensor elements and configured to estimate a rotational position of the shaft by combining signals of the at least three magnetic field sensor elements when, in operation, the end portion is magnetized and alters a magnetic field sensed by the at least three magnetic field sensor elements when the end portion rotates with the shaft,
wherein the circuitry is configured to estimate a transient angle error and adjust the estimated rotational position of the shaft based on the estimated transient angle error.

* * * * *